United States Patent
He et al.

(10) Patent No.: US 11,985,045 B2
(45) Date of Patent: May 14, 2024

(54) METHOD AND APPARATUS FOR SUBSCRIBING CHANGE NOTIFICATION OF NETWORK FUNCTION

(71) Applicant: Telefonaktiebolaget LM Ericsson (publ), Stockholm (SE)

(72) Inventors: Yingjiao He, Shanghai (CN); Xinyu Zhang, Shanghai (CN); Wu Wang, Shanghai (CN); Jinyin Zhu, Shanghai (CN); Deqin Zhan, Shanghai (CN); Yunjie Lu, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 42 days.

(21) Appl. No.: 17/915,154

(22) PCT Filed: Mar. 17, 2021

(86) PCT No.: PCT/CN2021/081331
§ 371 (c)(1),
(2) Date: Sep. 28, 2022

(87) PCT Pub. No.: WO2021/197074
PCT Pub. Date: Oct. 7, 2021

(65) Prior Publication Data
US 2023/0110726 A1  Apr. 13, 2023

(30) Foreign Application Priority Data

Mar. 31, 2020 (WO) ................ PCT/CN2020/082504

(51) Int. Cl.
*H04L 43/0864* (2022.01)
*H04L 41/342* (2022.01)
(Continued)

(52) U.S. Cl.
CPC ............ *H04L 41/342* (2022.05); *H04L 43/08* (2013.01); *H04L 43/20* (2022.05); *H04W 24/08* (2013.01)

(58) Field of Classification Search
CPC ....... H04L 41/342; H04L 43/20; H04L 43/08; H04W 24/08
(Continued)

(56) References Cited

U.S. PATENT DOCUMENTS

2014/0120887 A1* 5/2014 Huang ................. H04L 67/131
455/414.1
2016/0094542 A1* 3/2016 Lee .................... H04W 12/069
726/7
(Continued)

FOREIGN PATENT DOCUMENTS

WO  2019196813 A1  10/2019

OTHER PUBLICATIONS

3GPP, "3GPP TS 29.510 V16.2.0", 3rd Generation Partnership Project; Technical Specification Group Core Network and Terminals; 5G System; Network Function Repository Services; Stage 3 (Release 16), Dec. 2019, 1-167.
(Continued)

*Primary Examiner* — Jude Jean Gilles
(74) *Attorney, Agent, or Firm* — Murphy, Bilak & Homiller, PLLC (57) ABSTRACT

Embodiments of the present disclosure provides a method and an apparatus for subscribing a notification of a change of a network function. A method for subscribing to notification of a change of a network function may comprise: transmitting (S101) a subscription message to a monitoring network function; and receiving (S102) a notification from the monitoring network function to notify a change from the network function whose status is required to be monitored.
(Continued)

The subscription message indicates of the network function. The attribute comprises a serving scope indicating one or more target served area of the network function whose status is required to be monitored. According to embodiments of the present disclosure, a simple and fast implementation for subscribing notification of change of network function may be achieved. Particularly, both the response time and the accuracy of the notification about a change of a subscribed network function may be improved.

18 Claims, 5 Drawing Sheets

(51) Int. Cl.
  *H04L 43/08* (2022.01)
  *H04L 43/20* (2022.01)
  *H04L 67/306* (2022.01)
  *H04W 24/08* (2009.01)

(58) Field of Classification Search
  USPC .......................................................... 709/224
  See application file for complete search history.

(56) References Cited

U.S. PATENT DOCUMENTS

| | | | |
|---|---|---|---|
| 2017/0019335 A1* | 1/2017 | Schultz | H04L 45/028 |
| 2017/0086049 A1* | 3/2017 | Vrzic | H04W 36/18 |
| 2017/0171068 A1* | 6/2017 | Morper | H04L 45/66 |
| 2018/0103011 A1* | 4/2018 | Li | H04L 47/2475 |
| 2018/0248713 A1* | 8/2018 | Zanier | H04L 12/4633 |
| 2019/0230556 A1* | 7/2019 | Lee | H04W 28/16 |

OTHER PUBLICATIONS

China Mobile, "NF serving scope", 3GPP TSG-CT WG4 Meeting #95, C4-195384, Reno, US (CP-193063), Nov. 11-15, 2019, 1-26.
Ericsson, "Serving Scope for NF Subscriptions", 3GPP TSG-CT WG4 Meeting #97e, C4-202246, E-Meeting, Apr. 15-24, 2020, 1-7.
Ericsson, et al., "Subscription Data", 3GPP TSG CT WG4 Meeting #87, C4-188175, was C4-187617, West Palm Beach, US, Nov. 26-30, 2018, 1-20.
3GPP, "3GPP TS 29.510 V16.3.0", 3rd Generation Partnership Project; Technical Specification Group Core Network and Terminals; 5G System; Network Function Repository Services; Stage 3 (Release 16), Mar. 2020, 1-172.

* cited by examiner

METHOD AND APPARATUS FOR SUBSCRIBING CHANGE NOTIFICATION OF NETWORK FUNCTION

TECHNICAL FIELD

The present disclosure relates generally to the technology of communication system, and in particular, to a method and an apparatus for subscribing a notification of a change of a network function.

BACKGROUND

This section introduces aspects that may facilitate better understanding of the present disclosure. Accordingly, the statements of this section are to be read in this light and are not to be understood as admissions about what is in the prior art or what is not in the prior art.

In the communication network, a network function, NF, is usually connected to a plurality of other network functions, so as to provide services to and/or receive services from other network functions.

When the network function (i.e., as a NF Service Consumer) needs a service from another unconnected/unknown network function with particular capability/characteristic, the NF Service Consumer may transmit a subscription to a monitoring network function, about any other possible network function with such particular capability/characteristic. When the monitoring network function finds/discovers any change of any other network function with such particular capability/characteristic (i.e. a subscribed network function), the monitoring network function transmits notification to the NF Service Consumer about the change of the subscribed network function. Then, depending on the change notification (i.e., any kind of notification/message indicating the change), the NF Service Consumer may be connected to the subscribed network function which is newly added or capability/characteristics is changed, and receives services from/cooperates with the subscribed network function, the NF Service Consumer may not connected to the subscribed network function which is failed.

Such procedure may be referred as NFStatusSubscribe, such as defined in third generation partnership project technical specification, 3GPP TS, 29.510 (V16.2.0). In the 3GPP TS, 29.510 (V16.2.0), the NF Service Consumer needs to specify "subscrCond" attribute of the "SubscriptionData" object type.

However, some of the parameters related to the "subscrCond" cannot cause a fast and accurate notification about the subscribed network function. For example, if using the specific NFinstance Id to subscribe, the new registered NF can only be used after the cache TTL (time to live) expired and the new discovery. For another example, if using a NF/NF Service type to subscribe, for one subscribed NF/NF service type change, there might be quite some notification messages for all NF/NF services with the same type (e.g. one PLMN may have hundreds of AMFs, SMFs, etc.), while most of them might never be used for the requested NF/NF Service. PLMN may refer to Public Land Mobile Network, AMF may refer to Access and Mobility Management function, and SMF may refer to Session Management Function.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Certain aspects of the present disclosure and their embodiments may provide solutions to these or other challenges. There are, proposed herein, various embodiments which address one or more of the issues disclosed herein. Namely, according to embodiments of the present disclosure, a simple and fast implementation for subscribing status of network function may be achieved. Particularly, both the response time and the accuracy of the notification about subscribed network function may be improved.

A first aspect of the present disclosure provides a method for subscribing to notification of a change of a network node. The method may comprise: transmitting a subscription message to a monitoring network function, and receiving a notification from the monitoring network function, to notify a change from the network function whose status is required to be monitored. The subscription message may indicate a type of the network function, and further indicate an attribute of the network function. The attribute may comprise a serving scope indicating one or more target served area of the network function whose status is required to be monitored.

In embodiments of the present disclosure, the monitoring network function may monitor change of a plurality of network functions; and any one of the plurality of network functions which belongs to the type, and has the attribute may be determined as a subscribed network function whose status is required to be monitored.

In embodiments of the present disclosure, the subscription message may further include a first value range of the attribute; and the subscribed network function may further have a second value range of the attribute corresponding to the first value range.

In embodiments of the present disclosure, the second value range may at least include a part of the first value range.

In embodiments of the present disclosure, the first value range may include all of the second value range.

In embodiments of the present disclosure, the second value range may be the same as the first value range.

In embodiments of the present disclosure, the notification may indicate a registration of a subscribed network function whose status is required to be monitored.

In embodiments of the present disclosure, the monitoring network function may comprise a network function repository function, NRF. The network function may comprise at least one of a unified data management, UDM, a policy control function, PCF, an access and mobility management function, AMF, or a session management function, SMF.

A second aspect of the present disclosure provides a method performed at a monitoring network function for subscribing to notification of a change of a network function. The method may comprise: receiving a subscription message. The subscription message may indicate a type of the network function, and further indicate an attribute of the network function. The attribute may comprise a serving scope indicating one or more target served area of the network function whose status is required to be monitored. The method may further comprise: determining the network function whose status is required to be monitored, based on the type of the network function, and the attribute of the network function; and transmitting a notification, to notify a change from the network function whose status is required to be monitored.

In embodiments of the present disclosure, the monitoring network function may monitor change of a plurality of network functions; and any one of the plurality of network functions which belongs to the type, and has the attribute may be determined as a subscribed network function whose status is required to be monitored.

In embodiments of the present disclosure, the subscription message may further include a first value range of the attribute; and the subscribed network function may further have a second value range of the attribute corresponding to the first value range.

In embodiments of the present disclosure, the second value range may at least include a part of the first value range.

In embodiments of the present disclosure, the first value range may include all of the second value range.

In embodiments of the present disclosure, the second value range may be the same as the first value range.

In embodiments of the present disclosure, the notification may indicate a registration of a subscribed network function whose status is required to be monitored.

In embodiments of the present disclosure, the monitoring network function may comprise a network function repository function, NRF. The network function comprises at least one of a unified data management, UDM, a policy control function, PCF, an access and mobility management function, AMF, or a session management function, SMF.

A third aspect of the present disclosure provides an apparatus for a network function, comprising: a processor; and a memory, containing instructions executable by the processor. The network function is operative to implement the method according to any embodiment of the first aspect.

A fourth aspect of the present disclosure provides an apparatus for a monitoring network function, comprising: a processor; and a memory, containing instructions executable by the processor. The monitoring network function is operative to implement the method according to any embodiment of the second aspect.

A fifth aspect of the present disclosure provides a computer readable storage medium having a computer program stored thereon, the computer program executable by an apparatus to cause the apparatus to carry out the method according to any embodiment of the first aspect and/or the second aspect.

A sixth aspect of the present disclosure provides a network function, comprising: a transmission unit, configured to transmit a subscription message to a monitoring network function; and reception unit, configured to receive a notification from the monitoring network function to notify a change from the network function whose status is required to be monitored. The subscription message may indicate a type of the network function, and further indicate an attribute of the network function. The attribute may comprise a serving scope indicating one or more target served area of the network function whose status is required to be monitored.

A seventh aspect of the present disclosure provides a monitoring network function, comprising: a reception unit, configured to receive a subscription message. The subscription message may indicate a type of the network function, and further indicate an attribute of the network function. The attribute may comprise a serving scope indicating one or more target served area of the network function whose status is required to be monitored. The monitoring network function further comprise: a determination unit, configured to determine the network function whose status is required to be monitored, based on the type of the network function, and the attribute of the network function; and a transmission unit, configured to transmit a notification, to notify a change from the network function whose status is required to be monitored.

According to embodiments of the present disclosure, a simple and fast implementation for subscribing a notification of a change of network function may be achieved. Particularly, both the response time and the accuracy of the notification about subscribed network function may be improved.

BRIEF DESCRIPTION OF DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network", or "communication network/system" refers to a network/system following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "function", "node", "network function", "network node" or "network side node" refers to a network device/apparatus/entity with accessing capability in a communication network via which a terminal device accesses to the network and receives services therefrom. The node/function may include a base station (BS), an access point (AP), a multi-cell/multicast coordination entity (MCE), a server node/function (such as a service capability server/application server, SCS/AS, group communication service application server, GCS AS, application function, AF), an exposure node (such as a service capability exposure function, SCE, network exposure function, NEF), a controller, a session management function (SMF), an access and mobility management function (AMF), a unified data management (UDM), a policy control function (PCF), Network Data Analytics Services (NWDAF), a user plane function (UPF), any kind of monitoring/storage network function, such as network function repository function (NRF), or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Any of these network functions may be implemented either as a network element on a dedicated hardware, as a software instance running on a dedicated hardware, or as a virtualized function instantiated on an appropriate platform, e.g. on a cloud infrastructure. Virtualizing may mean creating virtual versions of apparatuses, devices which may include virtualizing hardware platforms, storage devices and networking resources. As used herein, virtualization can be applied to a network function or components thereof and relates to an implementation in which at least a portion of the functionality is implemented as one or more virtual components (e.g., via one or more applications, components, functions, virtual machines or containers executing on one or more physical processing resources (such as on a cloud infrastructure) in one or more networks.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term terminal device encompasses a device which is able to communicate with a network node, such as a base station, or with another wireless device by transmitting and/or receiving wireless signals. Thus, the term terminal device encompasses, but is not limited to: a mobile phone, a stationary or mobile wireless device for machine-to-machine communication, an integrated or embedded wireless card, an externally plugged in wireless card, a vehicle, etc.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Figure 1:
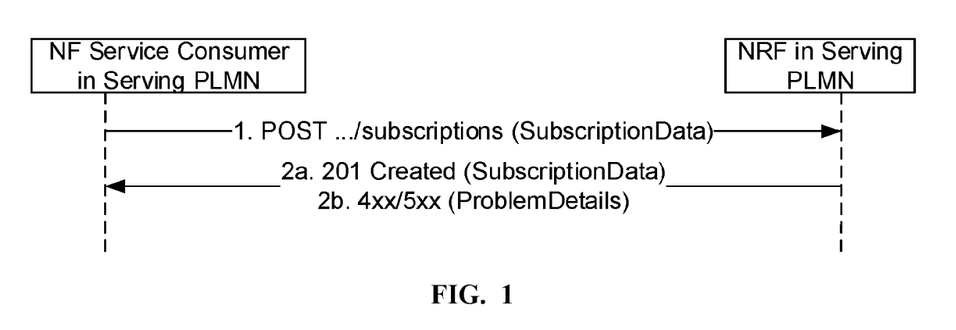
FIG. 1 is an exemplary diagram showing a subscription procedure.

FIG. 1 is an exemplary diagram showing a subscription procedure.

FIG. 1 is the same as the FIG. 5.2.2.5.2-1: Subscription to NF Instances in the same PLMN, in the 3GPP TS 29.510. This service operation (NFStatusSubscribe) is used to: create a subscription so an NF Service Consumer can request to be notified when NF Instances of a given set, following certain filter criteria are registered/deregistered in NRF or when their profile is modified; create a subscription to a specific NF Instance so an NF Service Consumer can request to be notified when the profile of such NF Instance is modified or when the NF Instance is deregistered from NRF.

The subscription to notifications on NF Instances is executed creating a new individual resource under the collection resource "subscriptions". The operation is invoked by issuing a POST request on the URI (uniform resource indicator) representing the "subscriptions" resource.

In step 1 in FIG. 1, the NF Service Consumer shall send a POST request to the resource URI representing the "subscriptions" collection resource.

The request body shall include the data indicating the type of notifications that the NF Service Consumer is interested in receiving; it also contains a callback URI, where the NF Service Consumer shall be prepared to receive the actual notification from the NRF (see NFStatusNotify operation in 5.2.2.6 of 3GPP TS 29.510) and it may contain a validity time, suggested by the NF Service Consumer, representing the time span during which the subscription is desired to be kept active.

The NF Service Consumer may request the creation of a subscription to a specific NF Instance, or to a set of NF Instances, where the set is determined according to different criteria specified in the request body, e.g. plmn id, or in the "subscrCond" attribute of the "SubscriptionData" object type (see clause 6.1.6.2.16 of 3GPP TS 29.510).

When the subscription request is for a set of NFs, the authorization attributes of the NF Instances in the set may differ, resulting in positive authorization of the subscription for only a part of the NF Instances in the set; in that case, the subscription to the set of NFs may be accepted by the NRF, but the NF Instances in the set that are not authorized for the NF Service Consumer that requested the subscription, shall not result in triggering any notification event from the NRF to the NF Service Consumer.

In step 2a of FIG. 1, on success, "201 Created" shall be returned. The response shall contain the data related to the created subscription, including the validity time, as determined by the NRF, after which the subscription becomes invalid. Once the subscription expires, if the NF Service Consumer wants to keep receiving status notifications, it shall create a new subscription in the NRF.

In step 2b of FIG. 1, if the creation of the subscription fails at the NRF due to errors in the SubscriptionData JSON object in the request body, the NRF shall return "400 Bad Request" status code with the ProblemDetails IE providing details of the error. JSON refers to JavaScript Object Notation, IE refers to information element.

If the creation of the subscription fails at the NRF due to NRF internal errors, the NRF shall return "500 Internal Server Error" status code with the ProblemDetails IE providing details of the error. "4xx/5xx" in FIG. 1 refers to any kind of status codes (e.g. the above 400, 500) which could be used to indicate the error.

Although a subscription to NF instances in the same Public Land Mobile Network, PLMN, is shown in FIG. 1, it should be understood, a subscription to NF instances in different PLMN is also possible, and intermediate forwarding NRF may also exist.

When the NF (such as SMF/AMF/UDM,) subscribes the change notification (i.e., any kind of notification/message indicating the change) to the NRF, the NF may use subscribing one specific NF type to the NRF, e.g UDM, PCF, AMF, SMF. Such subscription using NF type has the following advantage.

The implementation may be simple and fast. The new registered NF in the PLMN which meets the discovery criteria may be used immediately, compared to that if using NFinstance to subscribe, the new registered NF can only be used after the cache TTL expired and the new discovery. UDM may subscribe AMF type for AMF event regarding UE location change when UE moving between different AMFs. When in the future, the UPF is introduced with SBI (service based interface) architect, it is easy for the SMF immediately use the new added UPF.

An NF consumer may subscribe to NRF for the changes of all NF instances with certain NF type, e.g. a UDM/ NWDAF may subscribe to NF type AMF to get any new/ changed AMF/SMF instance(s) in order to provision event subscriptions targeting UE groups or any UE or all UEs; or some deployment may require SMF to pre-discover the peer NFs like UPF or PCF, before PDU session establishment, in such a use case an SMF can subscribe for new online UPF instances so it can establish PFCP association with them. When monitoring certain NF type, the subscription can only be applied to PLMN level, which may potentially generate large number of notifications of change which may be irrelevant, e.g. an NWDAF may subscribe to a group stationary CIoT devices which are deployed in certain geographical area(s), thus the notification for AMF/SMF instances outside of the target area(s) are irrelevant and should be avoid.

For this kind of subscription, there may be one conditional attribute for the subscribed NF/NF Service, i.e plmnId. However, since one PLMN may contain several hundred or thousand NFs with the same NF type (e.g., in one PLMN, the capacity of the first two years of 5G commercial rollout may have 500 AMFs, 600 SMFs, thousands of UPFs, 300 UDM, 300 PCF, if for NF Service, the number will be multiple and huge), for one subscribed NF/NF service type change, there might be quite some notification messages for all NF/NF services with the same type even in the same PLMN, while most of them might never be used for the requested NF/NF Service. The "subscription to all NF/NF Services with the same NF/NF Service type in one PLMN" may be quite demanding in terms of resources in NRF and also in terms of network traffic of the resulting notification, also the requester NF need store and maintain these maybe never-used NFs/NF Services.

Figure 2:
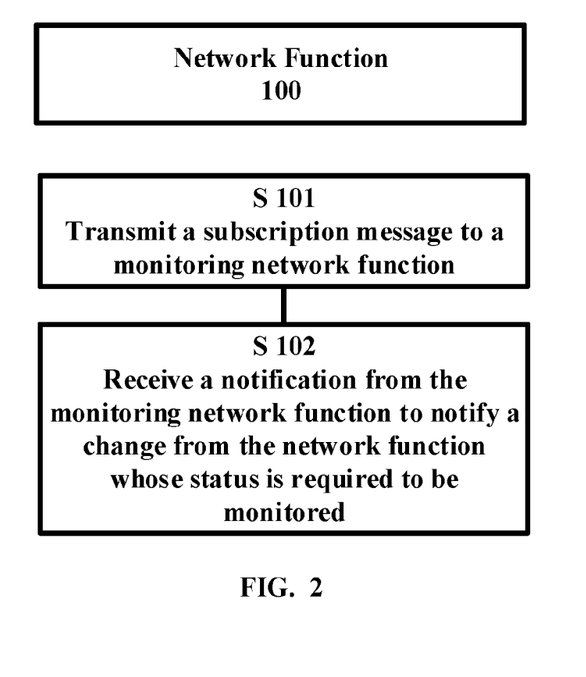
FIG. 2 is an exemplary flow chart showing a method for subscribing a notification of a change of network function, according to embodiments of the present disclosure.

FIG. 2 is an exemplary flow chart showing a method for subscribing a notification of a change of network function, according to embodiments of the present disclosure.

As shown in FIG. 2, the method may be performed at a network function 100, which is the NF service consumer.

The method may comprise: step S101, transmitting a subscription message to a monitoring network function; and step S102, receiving a notification from the monitoring network function, to notify a change from the network function whose status is required to be monitored. The subscription message may indicate a type of the network function, and further indicate an attribute of the network function.

According to embodiments of the present disclosure, by using a type, and an additional attribute of the network function to be subscribed, a simple and fast implementation for subscribing status of network function may be achieved. Particularly, the new registered NF in the PLMN which meets the discovery criteria may be used immediately, and the additional attribute can be used to limit the number of network function to be subscribed. Thus, both the response time and the accuracy of the notification about subscribed network function may be improved.

In embodiments of the present disclosure, any kind of attribute about the subscribed network function may be utilized.

Particularly, in the real network operation, for one requester NF (NF service consumer), the used/subscribed peer NFs/NFServices are mostly located in one area, so it is preferred to add one attribute about "serving areas"/"serving scope" to restrict the subscribed NF/NF Service type into one area of the PLMN, instead of the entire PLMN, that is: a location granularity to PLMN condition in NF Subscription Request may be achieved.

In embodiments of the present disclosure, the attribute may comprise a serving scope. Particularly, the serving scope may comprise at least one served area of the network function, particularly at least one target served area of a network function whose status is required to be monitored.

An exemplary attribute may be further added in subscription message as part of SubscriptionData. An attribute name may be servingScope, a data type may be array(string). The attribute may be optional, and a cardinality may be "1 . . . N". If present, this attribute indicates the target served area(s) of the NF instance(s) whose status is required to be monitored. It is noted that, an NF instance may explicitly indicate the served areas in the NF profile when registered to NRF. When this IE is present, the NRF shall only monitor the NF instance(s) indicating at least one of the served areas in the list. If an NF instance has not indicated any served area in its NF profile, it shall not be monitored.

For Nnrf_NFManagement API, the "servingScope" in the "SubscriptionData" may be described as "type: array; items: type: string; minItems: 1."

In embodiments of the present disclosure, the monitoring network function may monitor change of a plurality of network functions; and any one of the plurality of network functions which belongs to the type, and has the attribute may be determined as the subscribed network function whose status is required to be monitored. The change of the plurality of network functions may include addition/registration of new network function, removing of existing network function, or status change of existing network function, etc.

It is understood that the term "monitoring" should be explained generally. Namely, in a network, any network function that can obtain information/attribute/status of any other network function can be understood as having the functionality/capability to monitor the other network function. The monitoring network function may actively request the notification of a change of other network functions, or passively receive information from other network nodes, and then store them for providing later subscription service.

In embodiments of the present disclosure, as shown in FIG. 1, the monitoring network function may comprise a network function repository function, NRF.

In embodiments of the present disclosure, the subscription message may further include a first value range of the attribute; and the subscribed network function may further have a second value range of the attribute corresponding to the first value range.

That is, different matching criteria can be applied to further specify the subscribed network function.

In embodiments of the present disclosure, the second value range may at least include a part of the first value range.

This matching criterion may be referred as ANY (i.e. any of the areas in the servingAreas in SubscriptionData (in the subscription message) is part of the servingScope in the NFProfile (stored in the monitoring network function)).

In embodiments of the present disclosure, the first value range may include all of the second value range.

This matching criterion may be referred as ALL (i.e. all the areas in the servingAreas in SubscriptionData are part of the servingScope in the NFProfile, but the one in NFprofile can include further areas)

In embodiments of the present disclosure, the second value range may be the same as the first value range.

This matching criterion may be referred as STRICT (i.e. the servingAreas in SubscriptionData shall coincide with the servingScope in the NFProfile).

It should be understood that these matching criteria may be or not exclusive with each other. Further, any other criterion may be also possible.

In embodiments of the present disclosure, the notification may indicate a registration of the subscribed network function.

According to embodiments of the present disclosure, to ease the NF management and discovery operation, "served area/scope" concept was introduced with a smaller granularity and a served area can be pre-configured, e.g. geographical area, consists large number of TAIs (tracking area indicators). Any NF may explicitly indicate the areas it can serve in the NF profile when registered to the NRF.

Particularly, such embodiments about the "location granularity to PLMN condition in NF Subscription Request" provide the following advantage.

Simple and fast implementation for subscribing status of network function may be achieved. The new registered NF in the PLMN which meets the discovery criteria, especially for the NF type UPF, may be notified as the subscribed network function immediately. The subscription in one area of one PLMN is further limited, to reduce the demanding in terms of resources in NRF and also in terms of network traffic of the resulting notification. The need for storing and maintaining these never-used NF/NF Service types in one PLMN is reduced. Particularly, the attribute is aligned with the location granularity of NFprofile in Nnrf_NFManagment Service Register operation and Nnrf_NFDiscovery Service, for compatibility.

Figure 3:
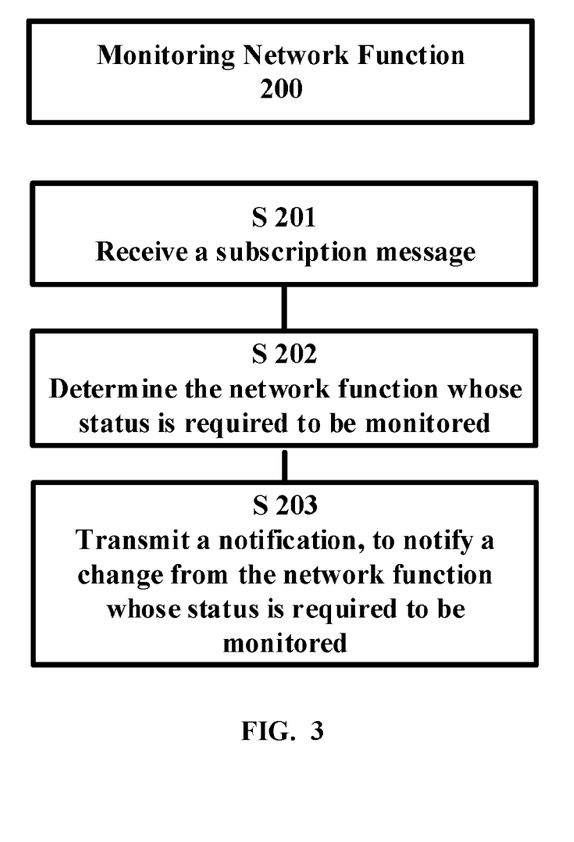
FIG. 3 is an exemplary flow chart showing a method performed by a monitoring network function for subscribing a notification of a change of network function, according to embodiments of the present disclosure.

FIG. 3 is an exemplary flow chart showing a method performed by a monitoring network function for subscribing a notification a change of network function, according to embodiments of the present disclosure.

As shown in FIG. 3, the method may be performed at a monitoring network function 200, such as the NRF.

The method may comprise: step S201, receiving a subscription message, wherein the subscription message may indicate a type of the network function, and further indicate an attribute of the network function; step S202, determining the network function whose status is required to be monitored, based on the type of the network function, and the attribute of the network function; and step S203, transmitting a notification, to notify a change from the network function whose status is required to be monitored.

For example, corresponding to the method performed by network function 100, the NRF may receive the subscription message from the network function 100. The NRF may compare the subscription message with the NFprofile from the registered network function and stored in the NRF, and then determine which network function registered in the NRF is the subscribed network function. The comparison may be based on any criteria above mentioned, such as "ANY", "ALL", "STRICT". The NRF may transmit a notification about the subscribed network function to the network function 100.

It should be understood, any other monitoring/managing/controlling/storing network function may provide such subscription service.

Figure 4:
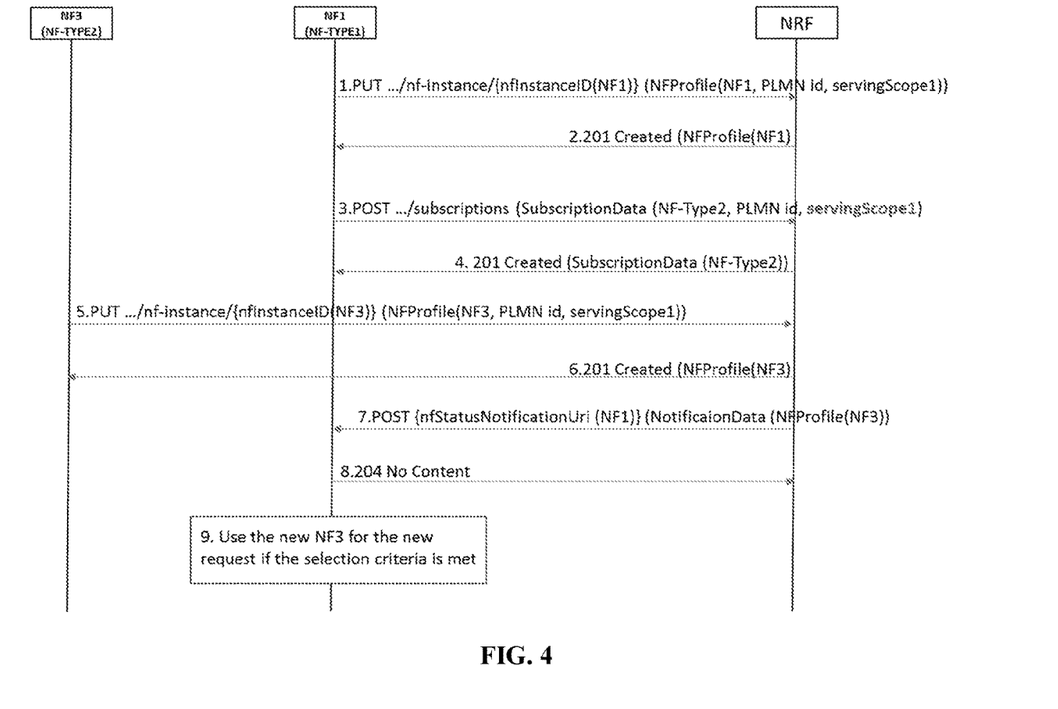
FIG. 4 is an exemplary diagram showing more details about functions and procedures according to embodiments of the present disclosure.

FIG. 4 is an exemplary diagram showing more details about functions and procedures according to embodiments of the present disclosure.

In step 1 in FIG. 4, when the NF1 (NF-Type1) starts to work, the NF1 sends HTTP PUT request (nfInstanceid (NF1),NFProfile (NF1, PLAN id, servingScope1) to the NRF for registration.

In step 2 in FIG. 4, the NRF accepts the registration and sends 201 created (NFProfile(NF1).

In step 3 in FIG. 4, the NF1 sends a subscription message, such as a HTTP POSTrequest (subscriptions (SubscriptionData (NF-Type2, PIMN id, servingScope1) to the NRF, subscribing for NF-Type2 with the restricting area: PLMN id, servingScope1. The servingScope is the introduced as new IE according to the present disclosure (namely, the attribute with the first value range).

In step 4 in FIG. 4, the NRF accepts the subscription and sends 201 created.

In step 5 in FIG. 4, a new NF3 (NF-Type2) starts to work, the NF3 sends HTTP PUT request (nfInstanceid(NF3), NFProfile (NF3, PLAN id, servingScope1) to the NRF for registration. An example of "STRICT" is shown, wherein the NF3 has the attribute with the second value range equal to the first value range.

In step 6 in FIG. 4, the NRF accepts the registration and sends 201 created.

In step 7 in FIG. 4, the NRF sends HTTP POST request {nfStatusNotificationUri (NF1)}(NotificationData (NFProfile(NF3)) to the NF1: there is new NF3 added in the PLMN id with servingScope1.

In step 8 in FIG. 4, the NF1 sends the 204 No content and stores the new NF3 information.

In step 9 in FIG. 4, the NF1 uses the new NF3 for the new request if the selection criteria is met.

It should be understood that NF3 (NF-Type2) may have another serving scope 2 corresponding to the serving scope 1 under other criteria, such as "ANY", "ALL". Further, the Type 2 and Type 1 may be or not the same.

An example of improved Definition of type SubscriptionData may be further provided, in which the attribute above described is further added.

Therefore, the definition of type SubscriptionData will include the attribute. The attribute name may be servingScope, a data type may be array(string). The attribute may be optional, and a cardinality may be "1 . . . N". If present, this attribute indicates the target served area(s) of the NF instance(s) whose status is required to be monitored. It is noted that, an NF instance may explicitly indicate the served areas in the NF profile when registered to NRF. When this IE is present, the NRF shall only monitor the NF instance(s) indicating at least one of the served areas in the list. If an NF instance has not indicated any served area in its NF profile, it shall not be monitored.

Further, an example improvement for "Nnrf_NFManagement API" is also shown, in which the attribute above mentioned may be further included. The attribute name will be servingScope, the attribute type will be array with items of string type. The minimum number of items may be 1.

Figure 5:
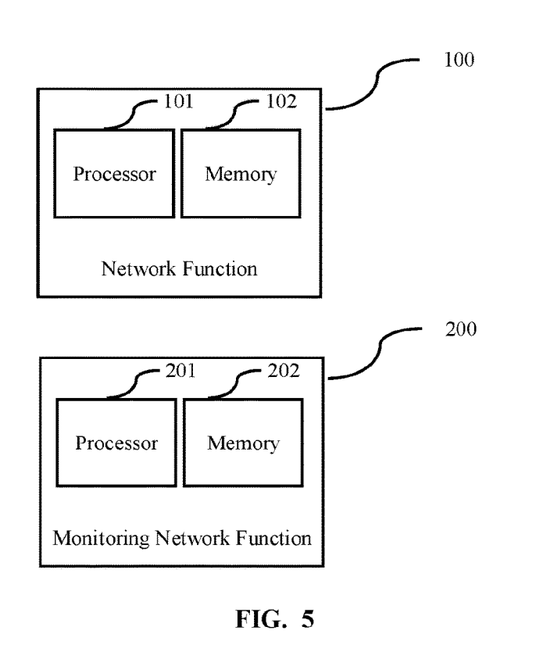
FIG. 5 is a block diagram showing blocks of the functions in accordance with embodiments of the present disclosure.

FIG. 5 is a block diagram showing blocks of the functions in accordance with embodiments of the present disclosure.

The apparatus for the network function 100 may comprise: a processor 101; and a memory 102, containing instructions executable by the processor 101. The network function 100 is operative to implement the method according to any embodiment above mentioned, such as shown in FIG. 1, 2, 4.

For example, the apparatus for the network function 100 may be operative to: transmit a subscription message to a monitoring network function; and receive a notification from the monitoring network function about a change of a subscribed network function. The subscription message may indicate a type of the network function, and further indicate an attribute of the network function.

The apparatus for the monitoring network function 200 may comprise: a processor 201; and a memory 202, containing instructions executable by the processor 201. The monitoring network function 200 is operative to implement the method according to any embodiment above mentioned, such as shown in FIG. 1, 3, 4.

For example, the apparatus for the monitoring network function 200 may be operative to: receive a subscription message; determine a subscribed network function; and transmit a notification about a change of the subscribed network function. The subscription message may indicate a type of the network function, and further indicate an attribute of the network function.

The processors 101, 201 may be any kind of processing component, such as one or more microprocessor or microcontrollers, as well as other digital hardware, which may include digital signal processors (DSPs), special-purpose digital logic, and the like. The memories 102, 202 may be any kind of storage component, such as read-only memory (ROM), random-access memory, cache memory, flash memory devices, optical storage devices, etc.

Figure 6:
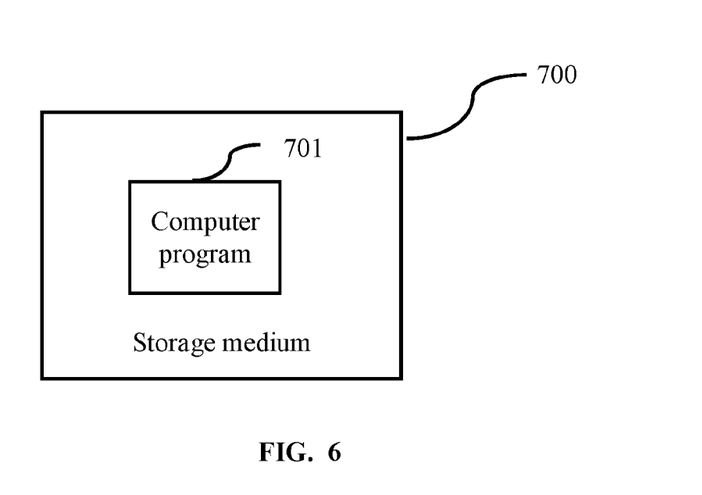
FIG. 6 is a block diagram showing a computer readable storage medium in accordance with embodiments of the present disclosure.

FIG. 6 is a block diagram showing a computer readable storage medium in accordance with embodiments of the present disclosure.

As shown in FIG. 6, the computer readable storage medium 700 having a computer program 701 stored thereon. The computer program 701 is executable by an apparatus to cause the apparatus to carry out any of the methods above mentioned, such as the methods shown in FIGS. 1-4.

The computer readable storage medium 700 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

Figure 7:
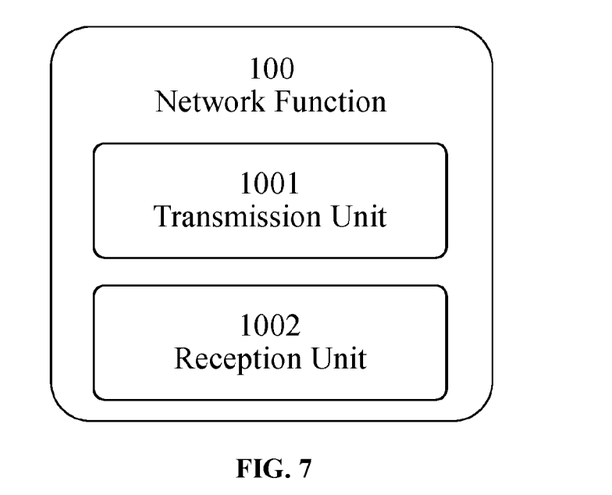
FIG. 7 is a schematic showing units of the network function 100.

FIG. 7 is a schematic showing units of the network function 100.

As shown in FIG. 7, the network function 100 may comprise: a transmission unit 1001, configured to transmit a subscription message to a monitoring network function; and reception unit 1002, configured to receive a notification from the monitoring network function to notify a change from the network function whose status is required to be monitored. The subscription message may indicate a type of the network function, and further indicate an attribute of the network function. The attribute may comprise a serving scope indicating one or more target served area of the network function whose status is required to be monitored.

Figure 8:
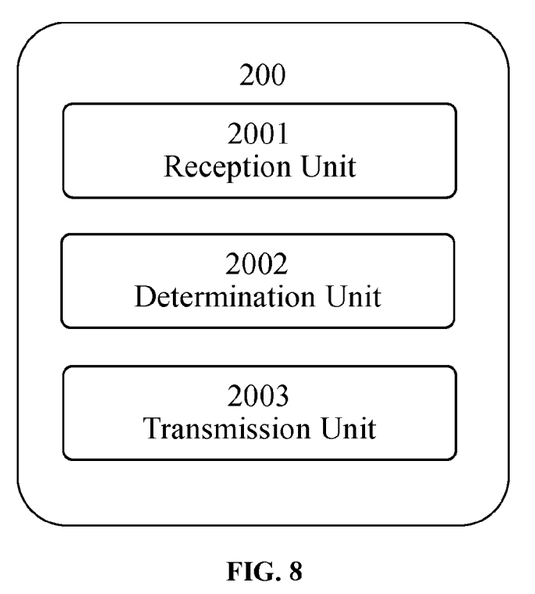
FIG. 8 is a schematic showing units of the monitoring network function 200.

FIG. 8 is a schematic showing units of the monitoring network function 200.

As shown in FIG. 8, the monitoring network function 200 may comprise a reception unit 2001, configured to receive a subscription message, wherein the subscription message may indicate a type of the network function, and further indicate an attribute of the network function; a determination unit 2002, configured to determine the network function whose status is required to be monitored, based on the type of the network function, and the attribute of the network function; and a transmission unit 2003, configured to transmit a notification, to notify a change from the network function whose status is required to be monitored. The attribute may comprise a serving scope indicating one or more target served area of the network function whose status is required to be monitored.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With these units, the server function, e.g. the network function 100, the monitoring network function 200 may not need a fixed processor or memory, any computing resource and storage resource may be arranged from at least one network node/device/entity/apparatus in the communication system. The virtualization technology and network computing technology may be further introduced, so as to improve the usage efficiency of the network resources and the flexibility of the network.

Particularly, these network functions, e.g. the network function 100, the monitoring network function 200, may be implemented either as a network element on a dedicated hardware, as a software instance running on a dedicated hardware, or as a virtualized function instantiated on an appropriate platform, e.g. on a cloud infrastructure.

According to embodiments of the present disclosure, a simple and fast implementation for subscribing status of network function may be achieved. Particularly, both the response time and the accuracy of the notification about subscribed network function may be improved.

In general, the various exemplary embodiments of the present disclosure may be implemented in hardware or special purpose circuits, software, logic or any combination thereof. For example, some aspects may be implemented in hardware, while other aspects may be implemented in firmware or software that may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may include circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by those skilled in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

The invention claimed is:

1. A method for subscribing to notification of a change of a network function, the method comprising:
    transmitting a subscription message to a monitoring network function, the subscription message indicating a type of the network function and further indicating an attribute of the network function, wherein the attribute comprises a serving scope indicating one or more target served areas of the network function whose status is required to be monitored; and
    receiving a notification from the monitoring network function to notify a change from the network function whose status is required to be monitored.

2. The method according to claim 1,
    wherein the monitoring network function monitors change of a plurality of network functions; and
    wherein any one of the plurality of network functions, which belongs to the type and has the attribute, is determined as a subscribed network function whose status is required to be monitored.

3. The method according to claim 2,
    wherein the subscription message further includes a first value range of the attribute; and
    wherein the subscribed network function further has a second value range of the attribute corresponding to the first value range.

4. The method according to claim 3, wherein the second value range at least includes a part of the first value range.

5. The method according to claim 3, wherein the first value range includes all of the second value range.

6. The method according to claim 3, wherein the second value range is the same as the first value range.

7. The method according to claim 1, wherein the notification indicates a registration of a subscribed network function whose status is required to be monitored.

8. The method according to claim 1,
    wherein the monitoring network function comprises a network function repository function (NRF); and wherein the network function comprises at least one of a unified data management (UDM), a policy control function (PCF), an access and mobility management function (AMF), or a session management function (SMF).

9. A method performed at a monitoring network function for subscribing to notification of a change of a network function, the method comprising:
receiving a subscription message indicating a type of the network function and further indicating an attribute of the network function, wherein the attribute comprises a serving scope indicating one or more target served areas of the network function whose status is required to be monitored;
determining the network function whose status is required to be monitored, based on the type of the network function and the attribute of the network function; and
transmitting a notification to notify a change from the network function whose status is required to be monitored.

10. The method according to claim 9,
wherein the monitoring network function monitors change of a plurality of network functions; and
wherein any one of the plurality of network functions, which belongs to the type and has the attribute, is determined as a subscribed network function whose status is required to be monitored.

11. The method according to claim 10,
wherein the subscription message further includes a first value range of the attribute; and
wherein the subscribed network function further has a second value range of the attribute corresponding to the first value range.

12. The method according to claim 11, wherein the second value range at least includes a part of the first value range.

13. The method according to claim 11, wherein the first value range includes all of the second value range.

14. The method according to claim 11, wherein the second value range is the same as the first value range.

15. The method according to claim 11, wherein the notification indicates a registration of a subscribed network function whose status is required to be monitored.

16. The method according to claim 11,
wherein the monitoring network function comprises a network function repository function (NRF); and
wherein the network function comprises at least one of a unified data management (UDM), a policy control function (PCF), an access and mobility management function (AMF), or a session management function (SMF).

17. An apparatus for a network function, the apparatus comprising:
a processor; and
a memory containing instructions executable by the processor whereby the network function is operative to:
transmit a subscription message to a monitoring network function, the subscription message indicating a type of the network function and further indicating an attribute of the network function, wherein the attribute comprises a serving scope indicating one or more target served areas of the network function whose status is required to be monitored; and
receive a notification from the monitoring network function to notify a change from the network function whose status is required to be monitored.

18. An apparatus for a monitoring network function, the apparatus comprising:
a processor; and
a memory containing instructions executable by the processor whereby the monitoring network function is operative to:
receive a subscription message indicating a type of the network function and further indicating an attribute of the network function, wherein the attribute comprises a serving scope indicating one or more target served areas of the network function whose status is required to be monitored;
determine the network function whose status is required to be monitored, based on the type of the network function and the attribute of the network function; and
transmit a notification to notify a change from the network function whose status is required to be monitored.

* * * * *

UNITED STATES PATENT AND TRADEMARK OFFICE
CERTIFICATE OF CORRECTION

PATENT NO. : 11,985,045 B2
APPLICATION NO. : 17/915154
DATED : May 14, 2024
INVENTOR(S) : He et al.

Page 1 of 3

It is certified that error appears in the above-identified patent and that said Letters Patent is hereby corrected as shown below:

On the Title Page

On Page 2, Item (57), under "ABSTRACT", in Column 1, Line 1, delete "The subscription message indicates of the network function." and insert -- The subscription message indicates a type of the network function, and further indicates an attribute of the network function. --, therefor.

In the Drawings

In Fig. 2, Sheet 1 of 5, delete Tag "S 101" and insert Tag -- S101 --, therefor.

In Fig. 2, Sheet 1 of 5, delete Tag "S 102" and insert Tag -- S102 --, therefor.

In Fig. 3, Sheet 2 of 5, delete Tag "S 201" and insert Tag -- S201 --, therefor.

In Fig. 3, Sheet 2 of 5, delete Tag "S 202" and insert Tag -- S202 --, therefor.

In Fig. 3, Sheet 2 of 5, delete Tag "S 203" and insert Tag -- S203 --, therefor.

In Fig. 4, Sheet 3 of 5, delete "(NFProfile(NF1)" and insert -- (NFProfile(NF1)) --, therefor.

In Fig. 4, Sheet 3 of 5, delete "servingScope1)" and insert -- servingScope1)) --, therefor.

In Fig. 4, Sheet 3 of 5, delete "(NFProfile(NF3)" and insert -- (NFProfile(NF3)) --, therefor.

In Fig. 4, Sheet 3 of 5, delete "(NotificaionData (NFProfile(NF3))" and insert -- (NotificationData (NFProfile(NF3))) --, therefor.

In the Specification

In Column 1, Line 40, delete "not" and insert -- not be --, therefor.

Signed and Sealed this
Eighteenth Day of February, 2025

Coke Morgan Stewart
*Acting Director of the United States Patent and Trademark Office*

CERTIFICATE OF CORRECTION (continued)
U.S. Pat. No. 11,985,045 B2

In Column 1, Line 42, delete "referred as" and insert -- referred to as --, therefor.

In Column 2, Line 48, delete "network function" and insert -- network --, therefor.

In Column 3, Line 23, delete "network function" and insert -- network --, therefor.

In Column 5, Line 50, delete "network function" and insert -- network --, therefor.

In Column 6, Line 1, delete "(e.g.," and insert -- e.g., --, therefor.

In Column 8, Line 9, delete "subscribe" and insert -- subscribe to --, therefor.

In Column 8, Line 10, delete "moving" and insert -- moves --, therefor.

In Column 8, Line 12, delete "SMF" and insert -- SMF to --, therefor.

In Column 8, Line 13, delete "new" and insert -- newly --, therefor.

In Column 8, Line 30, delete "avoid." and insert -- avoided. --, therefor.

In Column 8, Line 46, delete "store" and insert -- to store --, therefor.

In Column 9, Line 57, delete "network function" and insert -- network --, therefor.

In Column 10, Line 1, delete "referred as" and insert -- referred to as --, therefor.

In Column 10, Line 7, delete "referred as" and insert -- referred to as --, therefor.

In Column 10, Line 10, delete "areas)" and insert -- areas). --, therefor.

In Column 10, Line 13, delete "referred as" and insert -- referred to as --, therefor.

In Column 10, Line 37, delete "demanding" and insert -- demand --, therefor.

In Column 10, Line 47, delete "notification" and insert -- notification of --, therefor.

In Column 11, Lines 12-13, delete "(nfInstanceid(NF1)," and insert -- (nfInstanceid(NF1)), --, therefor.

In Column 11, Line 13, delete "PLAN" and insert -- PLMN --, therefor.

In Column 11, Line 16, delete "(NFProfile(NF1)." and insert -- (NFProfile(NF1)). --, therefor.

In Column 11, Line 18, delete "POSTrequest (subscriptions" and insert -- POST request subscriptions --, therefor.

CERTIFICATE OF CORRECTION (continued)
U.S. Pat. No. 11,985,045 B2

In Column 11, Line 19, delete "PIMN" and insert -- PLMN --, therefor.

In Column 11, Line 19, delete "servingScope1)" and insert -- servingScope1)) --, therefor.

In Column 11, Line 21, delete "is the" and insert -- is --, therefor.

In Column 11, Lines 27-28, delete "(nfInstanceid(NF3), NFProfile" and insert -- (nfInstanceid(NF3)), NFProfile --, therefor.

In Column 11, Line 28, delete "PLAN" and insert -- PLMN --, therefor.

In Column 11, Lines 35-36, delete "(NFProfile(NF3))" and insert -- (NFProfile(NF3))) --, therefor.

In Column 12, Line 6, delete "FIG. 1, 2, 4." and insert -- FIGS. 1, 2, 4. --, therefor.

In Column 12, Line 19, delete "FIG. 1, 3, 4." and insert -- FIGS. 1, 3, 4. --, therefor.

In the Claims

In Column 14, Line 67, in Claim 8, delete "network function" and insert -- network --, therefor.

In Column 16, Line 3, in Claim 16, delete "network function" and insert -- network --, therefor.